United States Patent
Kitz et al.

(10) Patent No.: US 10,786,938 B2
(45) Date of Patent: Sep. 29, 2020

(54) HEAT-INSULATING SHROUD FOR FACILITATING TEMPERATURE CONTROL OF A HEATED DEVICE OR PRODUCT

(71) Applicant: Sasipa Inc., Toronto (CA)

(72) Inventors: Harry Jay Kitz, Toronto (CA); Denis Pascal, Milton (CA)

(73) Assignee: SASIPA INC., Mississauga (CA)

( * ) Notice: Subject to any disclaimer, the term of this patent is extended or adjusted under 35 U.S.C. 154(b) by 729 days.

(21) Appl. No.: 15/381,794

(22) Filed: Dec. 16, 2016

(65) Prior Publication Data

US 2017/0173840 A1  Jun. 22, 2017

Related U.S. Application Data

(60) Provisional application No. 62/268,703, filed on Dec. 17, 2015.

(51) Int. Cl.
| | | |
|---|---|---|
| *B29C 48/80* | (2019.01) | |
| *B29C 48/25* | (2019.01) | |
| *F16L 59/02* | (2006.01) | |
| *B29C 48/275* | (2019.01) | |
| *B29C 48/92* | (2019.01) | |

(Continued)

(52) U.S. Cl.
CPC ............. *B29C 48/83* (2019.02); *B29C 45/74* (2013.01); *B29C 48/256* (2019.02); *B29C 48/276* (2019.02); *B29C 48/832* (2019.02); *B29C 48/834* (2019.02); *B29C 48/92* (2019.02); *F16L 59/02* (2013.01); *B29B 7/823* (2013.01); *B29C 2948/92704* (2019.02); *Y02P 70/263* (2015.11)

(58) Field of Classification Search
CPC ............................ B29C 48/83; A41D 13/0025
USPC ...................................................... 2/2.11, 2.14
See application file for complete search history.

(56) References Cited

U.S. PATENT DOCUMENTS

| 2,721,729 A | 10/1955 | Riper |
| 4,072,185 A | 2/1978 | Nelson |

(Continued)

FOREIGN PATENT DOCUMENTS

| CN | 201659677 | 12/2010 |
| CN | 203110249 | 8/2013 |

(Continued)

OTHER PUBLICATIONS

International Search Report and Written Opinion for PCT/CA2016/051495 dated Jan. 26, 2017.

*Primary Examiner* — William P Watkins, III (57) ABSTRACT

A heat-insulating shroud for facilitating temperature control of a heated article includes a flexible cover, made from a heat-insulating material, for covering a surface of the heated article, at least one air inlet defined in a first section of the flexible cover, and at least one air outlet defined in a second section of the flexible cover. In a cooling mode of operation, the flexible cover defines an air channel over the surface of the heated article for channeling an air stream from the air inlet(s) over the surface of the heated article towards the air outlet(s). The channeling of the air stream facilitates cooling the heated article. In a heat-conservation mode of operation, the flexible cover of heat-insulating material insulates the heated article from heat loss. Each air outlet may have a closure that opens during the cooling mode of operation and closes during the heat-conservation mode of operation.

20 Claims, 6 Drawing Sheets

(51) Int. Cl.
    *B29C 45/74*     (2006.01)
    *B29B 7/82*     (2006.01)

(56) References Cited

U.S. PATENT DOCUMENTS

| | | |
|---|---|---|
| 4,548,341 A | 10/1985 | Hambleton |
| 4,558,210 A | 12/1985 | Leary |
| 4,758,146 A | 7/1988 | Piazzola |
| 4,914,752 A * | 4/1990 | Hinson ............. A41D 13/0025 2/457 |
| 4,921,355 A | 5/1990 | Kuhler |
| 5,200,205 A | 4/1993 | Wissmann et al. |
| 2008/0060101 A1* | 3/2008 | Cadogan ................ B64G 6/00 2/2.11 |
| 2010/0108662 A1 | 5/2010 | Taylor et al. |
| 2011/0285164 A1* | 11/2011 | Hogan .................... B60J 11/08 296/95.1 |
| 2016/0193772 A1 | 7/2016 | Pendergraft et al. |
| 2016/0193773 A1 | 7/2016 | Pendergraft et al. |

FOREIGN PATENT DOCUMENTS

| | | |
|---|---|---|
| DE | 4032935 | 5/1991 |
| DE | 20 2014 104674 | 12/2014 |
| EP | 0122886 | 10/1984 |
| GB | 2 278 262 A | 11/1994 |
| GB | 2 302 490 A | 1/1997 |

\* cited by examiner

HEAT-INSULATING SHROUD FOR FACILITATING TEMPERATURE CONTROL OF A HEATED DEVICE OR PRODUCT

CROSS-REFERENCE TO RELATED APPLICATIONS

The present application claims the benefit of U.S. Provisional Patent Application No. 62/268,703 filed on Dec. 17, 2015, which is hereby incorporated by reference hereinto.

TECHNICAL FIELD

The present disclosure relates to shrouds, and more particularly to heat-insulating shrouds with a heat-retention mode of operation and a cooling or heat-dissipation mode of operation for facilitating temperature control of heated devices or products.

BACKGROUND

It may be desirable to operate a device, such as extruder, at a particular operating temperature, or within a range of operating temperatures, for optimal performance. An extruder is a piece of equipment that extrudes a material, such as a plastic, polymer, or resin, elastomer in a molten or plasticized form. The extruder typically has a barrel, which may be a steel tube, containing a rotatable auger (i.e. a screw). The material to be extruded may be received at a barrel inlet in a solid form (e.g. pellets). The material is heated as it is conveyed downstream by the rotating auger so as to cause the solid material to melt. An extrusion die at the end of the barrel may be used to impart a cross-sectional shape to the extrudate.

A heater is used to melt the material in the extruder. The heater may be an electric band heater having the shape of an annular cuff that surrounds the barrel. The band heater may for example be cast aluminum, brass, bronze, mica or ceramic.

Friction and shear forces produced inside the extruder barrel as the auger conveys and mixes the (typically viscous) material through the barrel may generate significant heat. This independent source of heat may compound the heat being generated by the band heater. If these heat sources were left unchecked, the material inside the extruder barrel could exceed a threshold temperature above which the material may become damaged (e.g. burned). For example, in the case of low-density polyethylene (LDPE), which typically melts at about 400-410 degrees Fahrenheit, a temperature of 550 degrees Fahrenheit or higher may undesirably burn or otherwise degrade the material. For clarity, the term "burn" as used herein does not necessarily mean combust, as the material within an extruder barrel is typically in a low-oxygen or oxygen-free environment in which combustion cannot readily occur. Rather, the term "burn" is used herein to refer generally to damage or degradation of a material due to exposure to high temperatures (which may in some cases include damage or degradation from combustion).

To reduce the risk of such material degradation, conventional band heaters may employ cooling mechanisms that are activated when temperatures become too high. The cooling mechanisms may be integrated with the heaters. For example, certain types of cast aluminum, brass or bronze heaters contain embedded pipes for conveying a coolant such as water. When cooling is required, the electric heating element(s) within the heater is (are) deactivated, and coolant is circulated through the cooling tubes.

Conventional heaters may alternatively employ a set of cooling fans for cooling purposes. The cooling fins may extend from the heater surface and are designed to promote cooling by increasing the surface area of the heater. The principle of operation of such cooling fins is similar to that of an automobile radiator or heat sink affixed to a microprocessor.

Cooling may be enhanced by blowing air over the cooling fins. The passing air "wipes" heat from the fins and carries it away. To cause the air to be directed over the fins, the finned heater may be enclosed in an enveloping cover, which is commonly referred to as a shroud. The shroud is typically made from sheet metal and may be bolted to the extruder so as to encompass the fins. A blower may be attached to the cover at an air inlet. The sheet metal shroud may support the blower. When cooling is required, the blower may be activated to blow air into the shroud via the air inlet. The air passes over the fins and then exits the shroud through an air outlet, carrying excess heat away with it.

Other forms of extruders may employ a ceramic heater having a perforated exterior to facilitate cooling through air circulation. Such ceramic heaters may similarly be enclosed in shrouds and may be similarly cooled via a blower.

SUMMARY

In one aspect, there is provided a heat-insulating shroud for facilitating temperature control of a heated article, comprising: a flexible cover made from a heat-insulating material for covering a surface of the heated article; an air inlet defined in or by a first section of the flexible cover; and an air outlet defined in or by a second section of the flexible cover, wherein the flexible cover is configured to channel an air stream from the air inlet over the surface of the heated article towards the air outlet to facilitate cooling of the heated article.

In some embodiments, the heat-insulating material comprises batting.

In some embodiments, the heat-insulating material comprises a cloth.

In some embodiments, the heat-insulating material comprises at least one one of: polytetrafluoroethylene (PFTE)-impregnated fiberglass; aluminized fiberglass; mica-impregnated fiberglass; silicone rubber impregnated fiberglass; aerogel insulation; and ceramic fiber insulation.

In some embodiments, the air outlet comprises: a hole in the flexible cover; and a closure configured to close the hole when an air pressure on an interior of the flexible cover is substantially the same as an air pressure on an exterior surface of the flexible cover, the closing of the hole for limiting heat loss through the hole. The closure may be configured to open the hole when the air pressure on the interior surface of the flexible cover exceeds the air pressure on the exterior surface of the flexible cover, the opening of hole for exhausting the air stream to facilitate the cooling of the heated article. The closure may be a flap attached to the flexible cover, the flap being operable to cover the hole to effect the closing. The closing of the flap may be assisted by gravity.

In some embodiments, the air outlet comprises a slit in the flexible cover.

In some embodiments, the air inlet comprises a hole in the flexible cover, the hole comprising a fitting for attachment of a hose or duct.

In some embodiments, the heat-insulating shroud further comprises an attachment mechanism for attaching the flexible cover so as to cover the heated article.

In some embodiments, the flexible cover has a sleeve shape when in use. The flexible cover may comprise a rigid wall at either end or both ends of the sleeve.

In some embodiments, the heat-insulating shroud further comprises a support structure for supporting the flexible cover adjacent to the surface of the heated article. The support structure may comprise a resilient member. The resilient member may bias or hold at least a portion of the flexible cover away from the surface of the heated article.

In another aspect, there is provided a heat-insulating shroud having a cooling mode of operation and a heat-conservation mode of operation, the heat-insulating shroud comprising: a flexible cover of heat-insulating material for covering a surface of a heated article; an air inlet defined in or by a first section of the flexible cover; and an air outlet defined in or by a second section of the flexible cover, wherein, in the cooling mode of operation, the flexible cover defines an air channel over the surface of the heated article, the air channel for channeling an air stream from the air inlet over the surface of the heated article towards the air outlet for exhaustion to the atmosphere, the channeling of the air stream to facilitate cooling the heated article, and wherein, in the heat-conservation mode of operation, the flexible cover of heat-insulating material insulates the heated article from heat loss.

In some embodiments, the heat-insulating shroud further comprises a closure for the air outlet, the closure being operable to close the air outlet in the heat-conservation mode of operation and to open the air outlet in the cooling mode of operation. The closure may be configured to open when a pressure differential from an inner surface of the flexible cover to an outer surface of the flexible cover is positive. The closure may be a flap, and closing of the air outlet by the flap may be assisted by gravity.

In some embodiments, either one or both of the first section of the flexible cover and the second section of the flexible cover is rigid.

BRIEF DESCRIPTION OF THE DRAWINGS

In the figures which illustrate example embodiments.

DETAILED DESCRIPTION

In this document, the term "exemplary" should be understood to mean "an example of" and not necessarily to mean that the example is preferable or optimal in some way. The term "article" should be understood to refer to a product, a device, or another type of object. Terms such as "top," "bottom," and "height" may be used to describe some embodiments in this description but should not be understood to necessarily connote an orientation of the embodiments during use.

Figure 1:
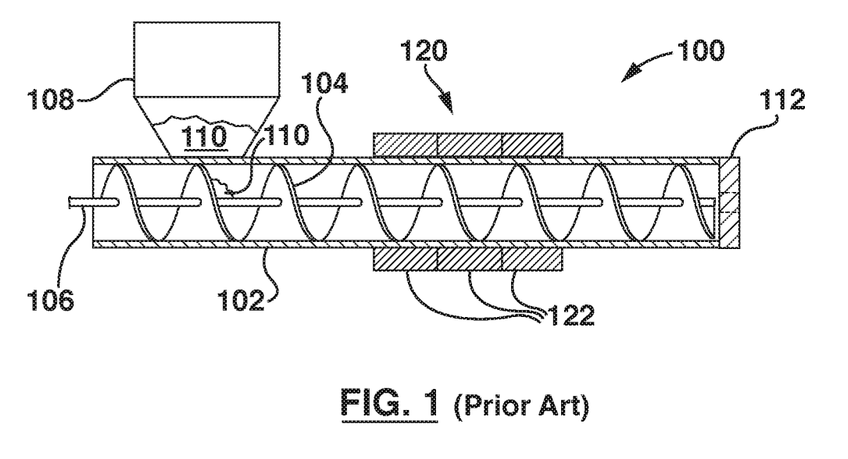
FIG. 1 is a cross sectional view of a portion of a heated device, namely an extruder.

Referring to FIG. 1, an exemplary conventional extruder 100 is illustrated in longitudinal cross section. The extruder 100 includes a cylindrical barrel 102 containing an auger 104 having a central shaft 106 the auger/shaft is commonly referred to as a "screw." A hopper 108 feeds material 110, in solid form (e.g. pellets), into the barrel 102. The material may for example be a plastic, a polymer, a resin, or an elastomer, to name but several examples. Other materials that may be extruded by the extruder 100 may include foodstuffs. For example, many breakfast cereals having distinctive shapes attain their shapes by being extruded through a die. The auger 104 can be rotated to cause the material 110 to be conveyed in a downstream direction for extrusion from a die 112. A motor and gearbox (not illustrated) may be mechanically coupled to the shaft 106 for rotating the auger 104. The extruder 100 may for example form part of a larger system or machine in an industrial environment (not illustrated).

The extruder 100 also includes a heater 120 that surrounds the barrel 102. When the extruder 100 is initially turned on (and, possibly in some embodiments, in a steady state of operation as well), the heater 120 heats the barrel 102 so that the solid material melts as it is conveyed, to facilitate extrusion. In this embodiment, the heater 120 is tubular and is comprised of a plurality of conventional band heaters (three in this example) arranged side-by-side. The band heaters are referred to herein generically and collectively as band heater(s) 122.

Figure 2:
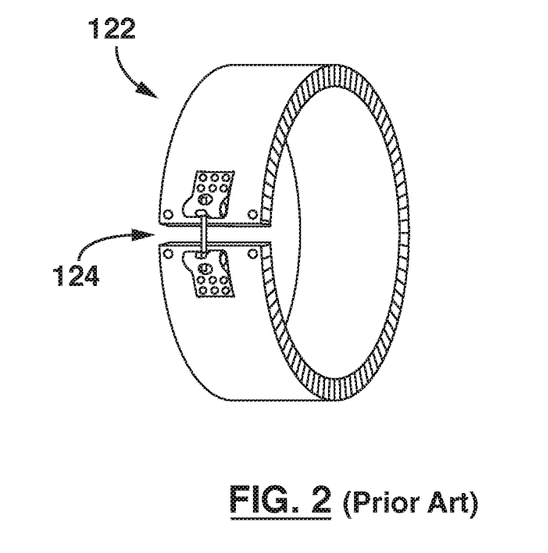
FIG. 2 is a perspective view of a band heater component of the device of FIG. 1.

FIG. 2 illustrates a single exemplary band heater 122 in isolation in perspective view. The band heater 122 is shaped like an annular cuff and has a longitudinal opening 124. The opening 124 facilitates attachment of the heater 122 to the barrel 102. In some embodiments, the band heater 122 may be separable into two generally C-shaped mirror-image halves that may be clamped or bolted onto the extruder barrel 102 so as to surround the barrel. The band heater 122 may for example be made from cast aluminum, cast brass, cast bronze, or mica, to name but several examples. The heater 122 may be a tubular band heater. Different types of heaters may be used in alternative embodiments. The illustrated heater 122 does not have fins, vents or perforations for facilitating cooling. Heaters in alternative embodiments may have one or more of those features.

Friction and shear forces generated inside the barrel 102 during operation of the extruder 100 may produce significant heat. The friction and sheer forces generated inside the barrel 102 may, in the steady state of extruder 100 operation, be sufficient to provide all of the heat required to melt the plastic, without the benefit of the heater 122. If left unchecked, however, excessive heat within the extruder barrel could undesirably burn or degrade the material 110. To reduce the risk of such degradation of the material 110, the illustrated embodiment employs a heat-insulating shroud, in a cooling (heat-dissipation) mode of operation, to remove excess heat from the heater 122 and/or extruder barrel 102, so that an optimal operating temperature may be maintained.

Figure 3:
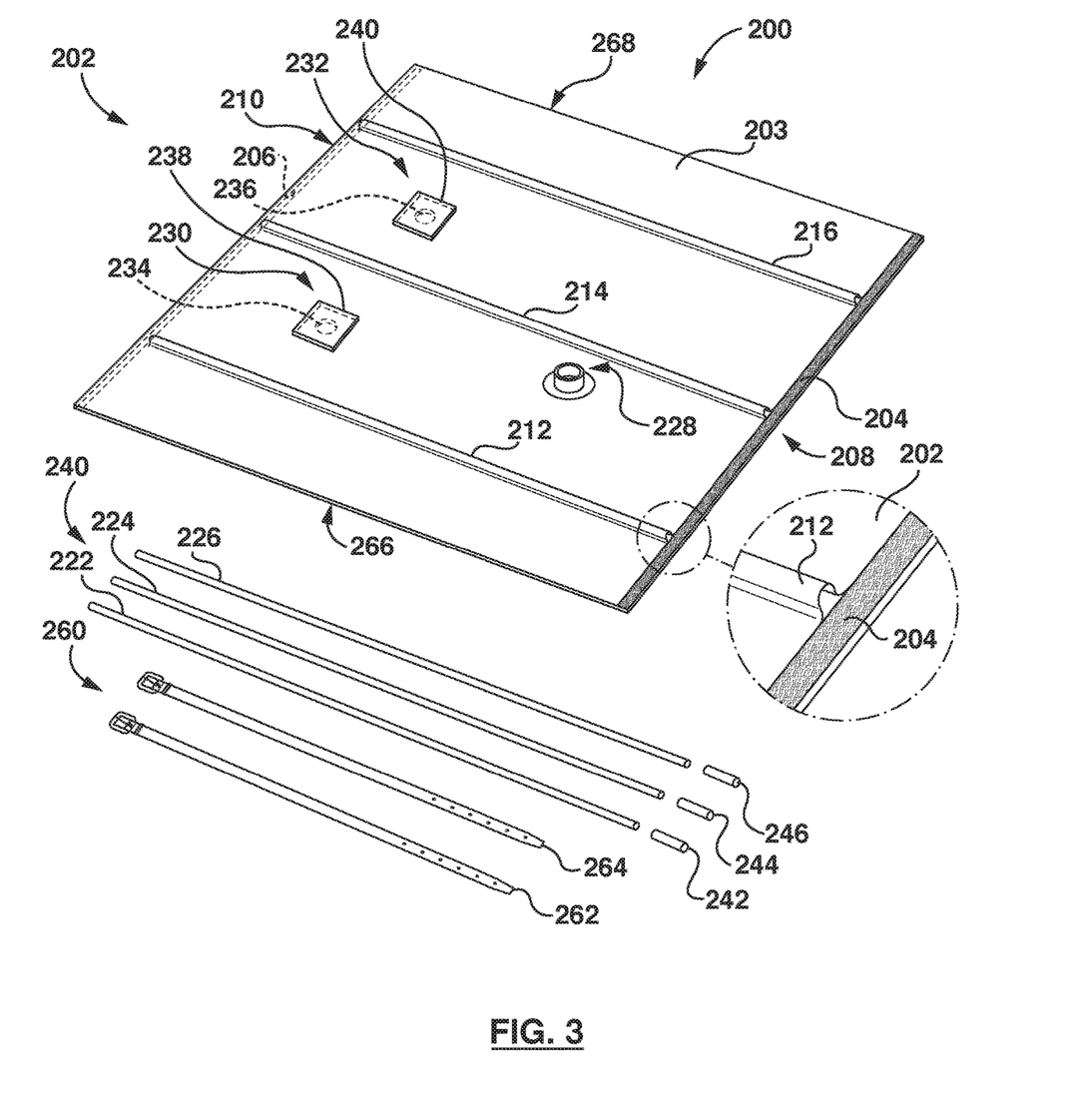
FIG. 3 is a perspective view of an exemplary heat-insulating shroud in a disassembled state.

Referring to FIG. 3, an exemplary heat-insulating shroud 200 that may be used for facilitating temperature control (including cooling) of a heated article (here, heater 120 and/or extruder barrel 102 of FIG. 1) is illustrated. FIG. 3 shows the heat-insulating shroud 200 in a disassembled state. The shroud 200 is shown in an assembled state in subsequent figures.

As illustrated in FIG. 3, the heat-insulating shroud 200 includes a flexible cover 202, support structure 240, and an attachment mechanism 260.

The flexible cover 202 of the present embodiment is a generally rectangular blanket or pad of heat-insulating material. The cover 202 is configured (e.g. sized and shaped) to be wrapped around the barrel 102 of the extruder 100 to form a sleeve that loosely encompasses the heater 120, as will be described below.

The flexible cover 202 has fasteners 204, 206 along its opposing edges 208, 210, respectively. The fasteners allow the rectangular blanket to be wrapped back onto itself so that the edges 208, 210 of the cover 202 can be fastened to one another to form the sleeve. In the illustrated embodiment, the fasteners 204, 206 are complementary strips of hook-and-loop fasteners (e.g. Velcro™ strips). Other embodiments of flexible cover 202 could employ other types of fasteners, including but not limited to snaps, twist fasteners and grommets, magnets, and ties, to name but a few examples.

The heat-insulating material from which the cover is made may be a flexible material such as a cloth or batting for example. Examples of different types of heat-insulating material that may be used include one or more of: polytetrafluoroethylene (PFTE)-impregnated fiberglass (e.g. Teflon™-impregnated fiberglass); aluminized fiberglass; mica-impregnated fiberglass; silicone rubber impregnated fiberglass; aerogel insulation; ceramic fiber insulation; or other forms of fiberglass insulation.

In some embodiments the flexible cover 202 is comprised of multiple layers of material. For example, the flexible cover may comprise an outer layer of aluminized fiberglass and an inner layer of aerogel insulation. If a fiberglass heat-insulating material is used, the fiberglass layer may be enveloped by, or sandwiched between two layers of, a tightly woven fabric. The fabric may serve to contain any stray glass fibers, so as limit the risk that such fibers will become airborne during use of the shroud. In at least some applications, such airborne glass fibers could pose a safety risk to nearby personnel, e.g. due to skin, eye or lung irritation.

In the illustrated embodiment, the flexible cover 202 has three transverse fabric sleeves 212, 214, and 216 sewn onto its upper surface 203. The upper surface 203 of the cover 202 is the surface that will face outwardly when the flexible cover 202 is formed into a sleeve. One end of transverse sleeve 212 is shown in close-up view in FIG. 3; the other transverse sleeves 214, 216 have a similar appearance. The transverse sleeves 212, 214 and 216 are designed to receive respective resilient members (e.g. fiberglass poles or steel poles) 222, 224, and 226 that make up the support structure 240, described below. In this regard, the sleeves 212, 214 and 216 can be compared to the sleeves on an exterior of a self-supporting tent of the type used for camping, which are designed to receive resilient poles to give the tent its shape when assembled. The support structure 240 of the heat-insulating shroud 200 is described in more detail below.

Referring still to FIG. 3, an air inlet 228 is defined in a first section of the flexible cover 202, and a pair of air outlets 230, 232 is defined in a second section of the flexible cover 202. The air inlet and air outlets are used when the heat-insulating shroud is being used in a cooling mode of operation, described below.

In the present embodiment, the air inlet 228 comprises a round fitting attached (e.g. sewn) to the flexible cover 202. The fitting is suitable for releasable attachment of a hose or duct that will provide an air stream into the heat-insulating shroud when used in the cooling mode of operation. Use of a hose that is flexible may facilitate repositioning during installation, e.g. in the event that the extruder 100 is in a cramped space.

Each air outlet 230, 232 of the present embodiment comprises a hole 234, 236 with an associated closure to 238, 240, respectively. The closure is configured to open when a pressure differential from within the shroud (i.e. from an interior of the flexible cover) to the atmosphere surrounding the shroud (i.e. to an exterior of the flexible cover) is positive. The opening may for example be intended occur when the interior pressure exceeds the external air pressure, e.g. by a predetermined percentage or amount. The opening will allow air that has been blown into the shroud 200 for cooling purposes to be exhausted to the atmosphere.

In the present environment, each closure comprises a flap. The flaps 238, 240 are sized to cover their respective holes 234, 236 when the heat-insulating shroud is being used in a heat-conservation mode of operation. The flaps 238, 240 of the present embodiment are configured (e.g. oriented) so that, when the heat-insulating shroud 200 has been assembled and installed, closure of the flaps is assisted by gravity. The number of air inlets and air outlets may vary in alternative embodiments.

The support structure 240 is designed to hold at least a portion of flexible cover away from a surface of the heater 120. In the present embodiment, the support structure 240 comprises three resilient members, namely the resilient poles 222, 224 and 226 mentioned above. The poles may be made from fiberglass or spring steel for example. The support structure also includes three connectors 242, 244 and 246, each for connecting the two opposing ends of a respective pole 222, 224 and 226 to form a hoop. The connectors 242, 244 and 246 may be plastic or aluminum tubes for example.

The attachment mechanism 260 serves to attach the assembled heat-insulating shroud 200 either directly to the heated article with which the shroud will be used or to structure immediately surrounding the heated article with which the shroud will be used. In the present embodiment, the attachment mechanism 260 comprises a pair of straps 262, 264. Each strap is configured (e.g. sized) for attaching a respective edge 266, 268 of the flexible cover 202 about a circumference of the extruder barrel 102 (FIG. 1), as described below.

Figure 4:
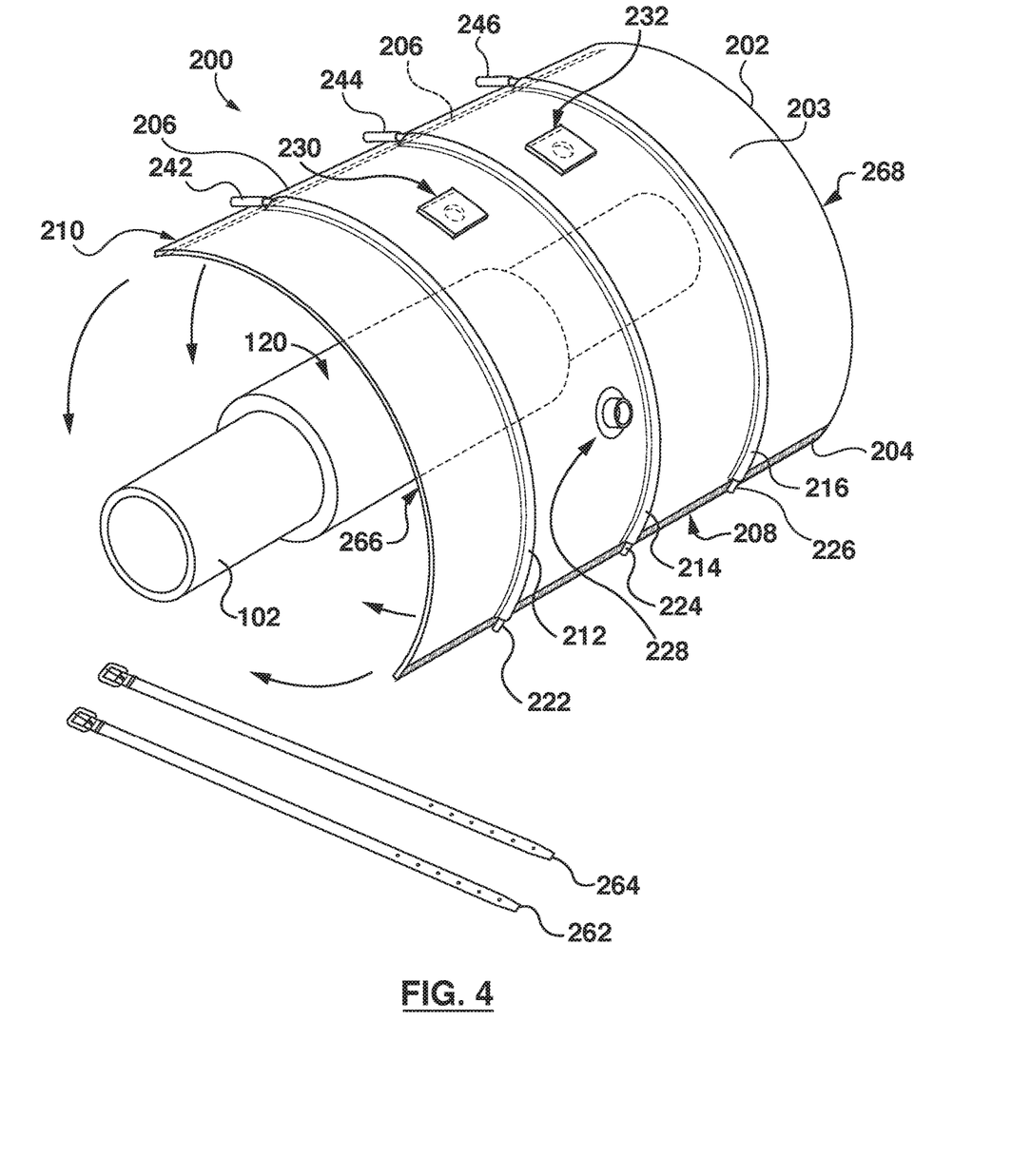
FIG. 4 is a perspective view of the heat-insulating shroud of FIG. 3 during assembly.

Assembly of the heat-insulated shroud 200 is shown in FIG. 4. As illustrated, the support structure 240 is attached to the flexible cover of the present environment by inserting each of the poles 222, 224 and 226 into a respective transverse sleeve 212, 214 and 216. A connector 242, 244 and 246 is attached to one end of each respective pole 222, 224 and 226. The flexible cover 202 may then be bent transversely around the extruder barrel 102 and heater 120, as shown by the arrows in FIG. 4, to bring each connector 242, 244 and 246 into proximity with the free end of its respective pole 222, 224 and 226 for connection therewith. When each of the poles has been connected to itself via its respective connector, the poles 222, 224 and 226 will each form a hoop. Edges 208, 210 can then be fastened to one another via hook-and-loop fasteners 204, 206 (or via another method in alternative embodiments) to form a sleeve that encompasses the heater 120 and immediately adjacent extruder barrel 102. Each hoop-shaped pole 222, 224 and 226 applies outward force upon the respective transverse sleeve 212, 214 and 216 through which it has been inserted. This force tends to impart a circular cross-sectional shape to the now sleeve-shaped heat-insulating shroud 200.

Figure 5:
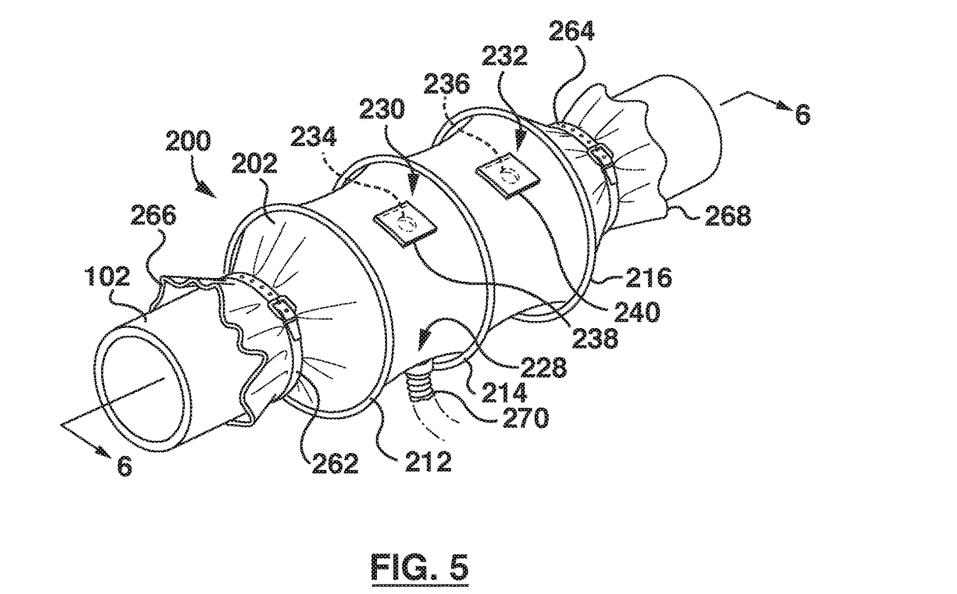
FIG. 5 is a perspective view of the heat-insulating shroud of FIG. 3, after assembly and installation onto the extruder of FIG. 1, in a heat-conservation mode of operation.
Figure 6:
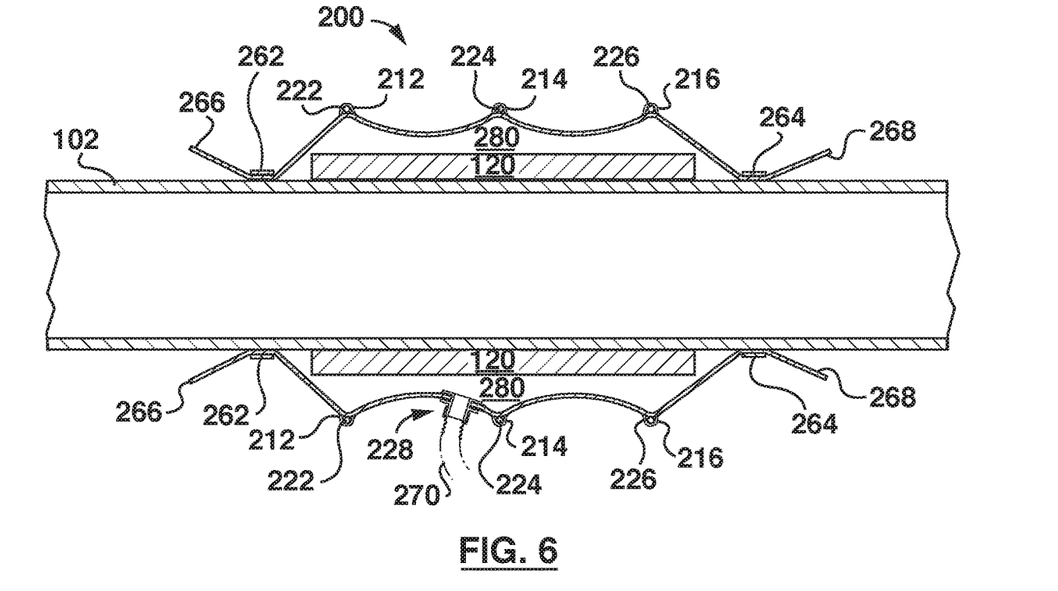
FIG. 6 is a cross sectional view of the assembled and installed heat-insulating shroud of FIG. 5 taken along line 6-6.

Attachment of the assembled heat-insulated shroud 200 to the extruder barrel 102 is shown in FIGS. 5 and 6. FIG. 5 is a perspective view of the shroud 200 attached to the barrel 102. FIG. 6 is a longitudinal cross-sectional view of the shroud of FIG. 6. For clarity, the auger 104 of extruder 100 is omitted from FIGS. 5 and 6.

As illustrated in FIGS. 5 and 6, the assembled shroud 200, which has a generally cylindrical sleeve shape in the present embodiment, is attached to the extruder barrel 102 via straps 262 and 264. In particular, the flexible edges 266, 268 of the flexible cover 202 are cinched against the extruder barrel 102 by the straps 262, 264, respectively. The cinching largely prevents air from passing between the extruder barrel 102 and edges 266, 268 of the flexible cover 202 (although some passage of air between the barrel 102 and the edges 266, 268 may occur, i.e. the seal is not necessarily fully airtight). In the result, the heat-insulating shroud 200 forms a cocoon that loosely encompasses the heater 120.

As perhaps best seen in FIG. 6, the inner diameter of the assembled shroud 200 is somewhat larger than the outer diameter of the heater 120. As a result, the attached shroud 200 defines an annular channel 280 around the heater 120 suitable for channeling air over the cylindrical outer surface of the heater 120 when the shroud 200 is used in a cooling mode of operation.

Referring to FIGS. 5 and 6, a hose 270 from a pressurized air source (e.g. a blower) is attached to the fitting of air inlet 228. This hose will provide a stream of pressurized air into the interior of the "cocoon" via air inlet 228 when the shroud 200 is used in the cooling mode of operation.

In operation, the shroud may be used in a heat-conservation mode of operation or in a cooling mode of operation.

Use of the heat-insulating shroud 200 in the heat-conservation mode of operation is shown in FIGS. 5 and 6. In this mode of operation, no air is blown from hose 270 into the interior of the shroud 200 via air inlet 228. The air pressure inside the annular channel 280 will accordingly be substantially the same as ambient air pressure, and the closures (flaps) 238, 240 covering the holes 234, 236 of air outlets 230, 232 will thus remain closed. As a result, any heat from the heated article (here, heater 120), which might otherwise be lost in the absence of the shroud 200 from radiative or convective effects, is conserved in view of the heat-insulating properties of the shroud 200.

In the present embodiment, closure of the flaps is assisted by gravity. This is not necessarily the case for other types of air outlet closures used in alternative embodiments. Some embodiments may not use flaps as such. For example, in some embodiments, in lieu of each flap, a solenoid-like device may be mounted or attached to the shroud. An electrical signal or command may be used to open the solenoid whenever the blower is activated. For example, the same signal or command that is used to energize the blower may be used to cause the solenoid(s) to open. The solenoid(s) may close in the absence of that signal, e.g. when the shroud is in the heat conservation mode and the blower is inactive.

The heat-conservation mode of operation may for example be used at to conserve energy when the extruder barrel 102 is being heated from ambient temperature upon equipment start-up. This may beneficially reduce heating costs. For example, some electrical power providers may bill each customer based not only upon actual kilowatt hours used, but additionally reflecting a so-called "demand charge." The demand charge may be based on a measure of the maximum usage of electrical power by the customer at a single time or brief time interval. The demand charge may be a standalone separate charge that is calculated periodically (e.g. monthly) and represents the peak demand by the customer over a predetermined time interval (e.g. a continuous fifteen-minute period). In other words, in one example, a demand charge for a billing cycle may be calculated based on the highest rate of electricity consumption by that consumer over any fifteen-minute interval occurring at any time during that billing cycle.

Use of the heat-insulating shroud 200 in the heat-conservation mode of operation may reduce a customer's maximum usage reading by reducing the amount of power required to initially heat equipment upon initial startup. The heat-insulating shroud may achieve this result by containing heat that would otherwise (i.e. in the absence of the heat-insulating shroud) be lost to the atmosphere by convection and radiation. Containment of the heat may allow the heater to bring the extruder and its contents to the desired temperature using less energy, possibly more quickly than would be required without the heat-insulating shroud. In the result, the demand charge may be reduced.

The heat-conservation mode of operation of the heat-insulating shroud 200 may also help to distribute heat uniformly within the shroud and throughout the covered article. This may help reduce hot spots or cold areas in the heated article which, depending upon the article, might otherwise exist and might be detrimental to the performance of the article (e.g. in the case of an extruder, hot or cold spots within the extrudate could result in imperfections in articles made from the extruded material).

It should be noted that, at least in the heat-conservation mode of operation, the weight of the flexible cover 202 and support structure 240 may cause the shroud 200 to sag relative to the heater 120. As a result, the annular gap 280 may be larger underneath the heater 120 than above the heater 120 (e.g. as shown in FIG. 6). In fact, the sagging may cause an upper portion of the shroud 200 to physically contact (i.e. to lay upon) an upper surface of the heater 120. Thus, it will be appreciated that the gap 280 may not be fully annular, at least in the heat-conservation mode of operation.

Figure 7:
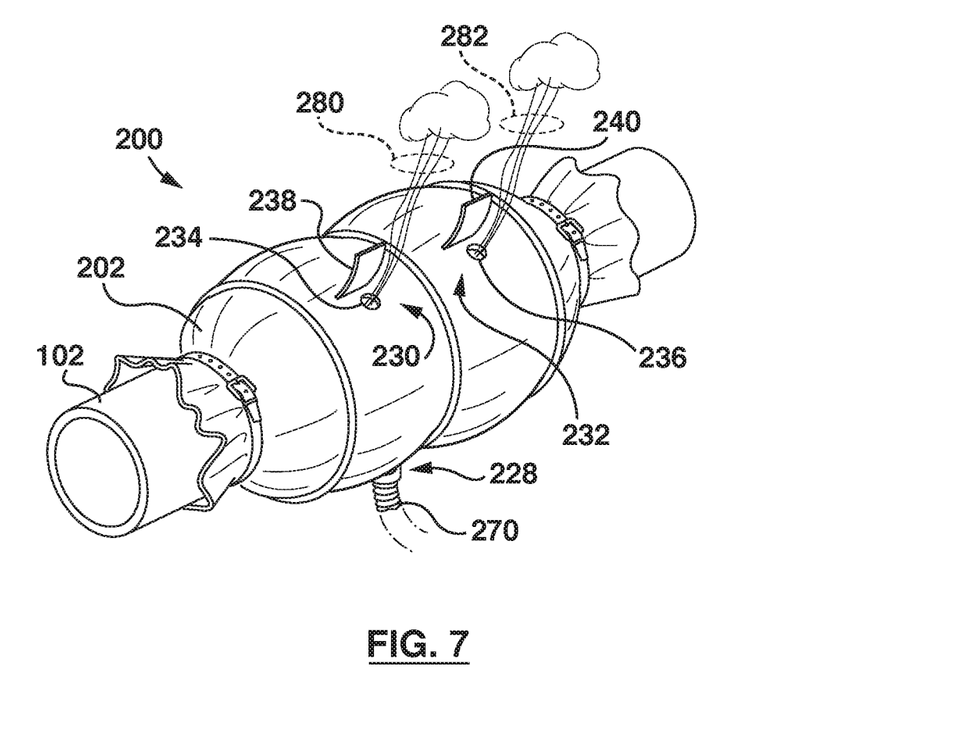
FIG. 7 is a perspective view of the heat-insulating shroud of FIG. 3, after assembly and installation onto the extruder of FIG. 1, in a cooling mode of operation.
Figure 8:
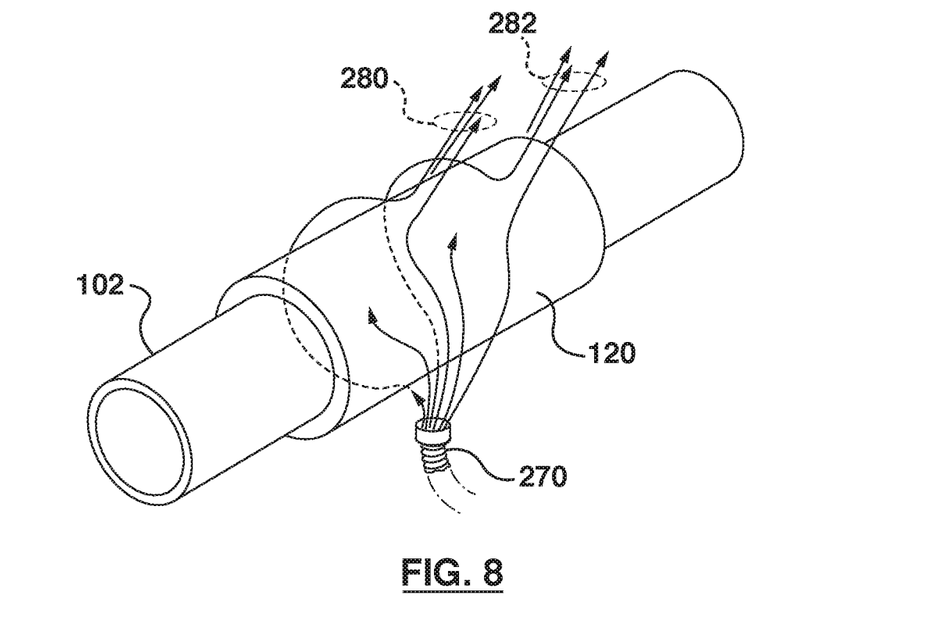
FIG. 8 is a perspective view of a portion of the extruder of FIG. 1, in isolation, showing air flow induced by the heat-insulating shroud of FIG. 7 during the cooling mode of operation.

The cooling mode of operation is illustrated in FIGS. 7 and 8. FIG. 7 is a perspective view of the shroud 200 and extruder barrel 102. FIG. 8 is a perspective view of the extruder barrel 102 and heater 120 in isolation with arrows showing air flow over the heater 120.

In the cooling mode of operation of the heat-insulating shroud 200, any active heating of the article to be cooled may be discontinued, i.e. the heater 120 may be turned off. A pressurized air source, such as a blower or fan, may then be activated to blow a stream of air from hose 270 into the interior of the shroud 200 via air inlet 228. This will cause the air pressure within the shroud 200 (i.e. inside the "cocoon") to increase in excess of ambient air pressure. The flexible cover 202 may appear to inflate slightly as a result of this pressure increase (see FIG. 7).

The flexible cover 200 will channel the air stream from the air inlet 228 over a surface of the article to be cooled. In the present embodiment, the air flows through the annular gap 280 around the cylindrical surface of the heater 120 (see FIG. 8), absorbing heat from the surface of the heater 120 as it flows. The heated air ultimately exits the shroud 200 through the air outlets 230, 232 in two separate streams 280, 282 (one per air outlet). The flaps 238, 240 that were previously covering holes 234, 236 in the heat-conservation mode of operation are now opened in view of the positive pressure differential from inside the shroud 200 (i.e. from an interior side of the flexible cover 202) to the outside of the shroud (i.e. to an exterior side of the flexible cover 202). The exiting air carries away the absorbed heat and thereby facilitates cooling of the barrel 102 and heater 120. In the result, a temperature of extruder barrel 102 and the material 110 contained therewithin may be kept below a threshold level, and a risk of burning or other damage to the material 110 can be reduced.

As will be appreciated from the foregoing description, the disclosed embodiment may provide various benefits, e.g. in comparison to conventional rigid (e.g. sheet metal) shrouds that encompass equipment to be cooled and through which air may be blown to facilitate cooling of the equipment.

One benefit may be ease of installation. For example, the flexibility of the flexible cover of the above-described heat-insulating shroud may permit the shroud to be installed even in cramped quarters. For instance, when a water-cooled heater (lacking an air-cooling shroud) is to be replaced with an air-cooled heater, the amount clearance around the barrel may be insufficient for a rigid (e.g. entirely sheet metal) shroud with a blower mounted directly to the shroud (the rigid shroud and blower typically defining an eccentric shape). However, the heat-insulating shroud disclosed herein has a flexible cover that may not only permit temporary flexing of the shroud during installation, but may also allow for localized deformation of the installed shroud, e.g. to accommodate outward protuberances from the enshrouded device/product or inward protuberances from the environment towards the device/product. Installation may also be facilitated because the heat-insulating fabric may be lighter than a metal shroud and thus easier to lift and position during installation (e.g. fewer installers may be needed). In contrast, sheet metal shrouds may be bulky, heavy and difficult to install in some extruder operating environments, e.g. in cramped quarters.

Another benefit of the heat-insulating shroud described above may be reduced storage space or shipping requirement relative to sheet metal shrouds. As discussed above in conjunction with FIGS. 3 and 4, the heat-insulating shroud 200 has a flexible cover that allows the shroud to lay flat or to be collapsed or folded, e.g. in a disassembled state. The flexibility of the shroud, as well as the collapsibility of any support structure used in conjunction with the shroud, may accordingly allow the shroud to occupy much less space than a conventional rigid shroud. This may reduce storage space requirements, e.g. in relation to rigid metal shrouds. Moreover, by shipping the shroud in a collapsed or disassembled state, it may be possible to reduce the size of the shipping container required for shipping the shroud, e.g. in relation to what would be required if the shroud were shipped in an assembled state. This may help to reduce shipping or freight costs and may speed delivery The heat-insulating properties of the shrouds disclosed herein may additionally promote safety by reducing a risk of burns to proximate human users from heated articles. In contrast, conventional sheet metal shrouds that encompass high-temperature articles may themselves become dangerously hot during use. Some metal shrouds may incorporate standoff mesh screens in an effort to make them "touch safe." However, touching the metal shroud in locations other than the standoff screen may still result in burned skin.

The heat-insulating properties of the shrouds disclosed herein may also beneficially promote a comfortable working environment. This is by virtue of the containment of heat within the shroud, particularly during a heat-conservation mode of operation. In the absence of a heat-insulating shroud, the heated article may heat the ambient environment to a temperature that is uncomfortable or even unsafe for proximate human users.

The heat-insulating shroud disclosed herein may also provide more reliable cooling over time than a conventional liquid-cooled aluminum, bronze or brass cast heater having internal channels for circulating a cooling fluid such as water. The reason is that liquid channels in aluminum cast heaters may be prone to cracking and leaking from thermal shock and to clogging due to mineral deposit formation within the channels.

Some embodiments of the heat-insulating shroud may provide not only heat insulation, but also electrical insulation. Many of the heat-insulating materials from which the flexible cover 202 may be made, as mentioned above, are poor electrical conductors. The shroud may accordingly provide a degree of electrical safety above and beyond what would be provided by a conventional sheet metal shroud.

Various alternative embodiments are possible.

The embodiment illustrated in the drawings has the general appearance of a sleeve when assembled. Other embodiments may have different shapes. The shape of the flexible cover and of the installed heat-insulating shroud may be dictated by a shape of a surface of the heated article to be cooled. For example, a shroud intended for cooling a spherical heated article may have the appearance of a full or partial sphere when assembled. A heat-insulating shroud intended for cooling a flat surface of a heated article may be substantially flat. The heat-insulating shroud could be made to cover virtually any shape of article, e.g. by adopting a suitable shape for the flexible cover and/or by providing suitable support structure.

The attachment mechanism 260 of the disclosed embodiment comprises a pair of straps 262, 264. Other attachment mechanisms could be used in alternative embodiments. Examples of other attachment mechanisms may include elastic gathers, fasteners such as hook-and-loop fasteners, snaps, magnets or twist fasteners and grommets, or other means. The attachment mechanism may be releasable to facilitate maintenance.

Some embodiments of the heat-insulating shroud may lack a support structure 240. In such cases, the flexible cover may omit sleeves 212, 214 and 216 for receiving support structure elements such as poles. A shroud lacking a support structure may simply appear to be draped over a surface of the heated article. The heat-insulating properties of the flexible cover, or more generally, the properties of the material from which the flexible cover is made, may limit any damage to the shroud resulting from direct contact with the heated article. When used in the cooling mode of operation, a shroud lacking a support structure may be lifted away from the surface of the heated article by air pressure.

The above-described embodiment employs sleeves for receiving resilient poles of the shroud's support structure. In alternative embodiments, the sleeves could be replaced with clips or other means for attaching the flexible cover to the support structure (if used).

When support structure is used, it may incorporate means for attaching the support structure to the heated article, such as support members having one or more feet or connectors suitable for attachment to the heated article.

Extruders and band heaters are not the only types of devices with which heat-insulating shrouds can be used. The heat-insulating shrouds may be used with other devices, such as industrial or factory equipment, auxiliary equipment on an internal combustion engine, or appliances, and possibly others.

The heat-insulating shroud could alternatively be used to facilitate temperature control of articles not strictly considered as devices, such as products. One example of such a product may be a vessel in which an exothermic reaction occurs. For example, some types of exothermic reactions only begin when a certain baseline temperature has been reached. A vessel for containing the reaction may initially require heating to the baseline temperature so that the exothermic reaction will begin. Once the reaction begins, it may be desirable to cool the vessel in order to prevent an excessive buildup of heat from the exothermic reaction.

Although the flexible cover 202 is shown as being flexible over its entire extent, this is not necessarily a requirement. A flexible cover may incorporate rigid sections with flexible (e.g. cloth) sections therebetween. The rigid sections may be used for various purposes. For example, in some embodiments, one or more air inlets to the shroud, and/or one or more air outlets from the shroud, may be defined in respective rigid sections of the flexible cover. In some embodiments, a rigid section may be used to facilitate attachment of the heat-insulating shroud to equipment during installation or to reduce or eliminate the need for other forms of shroud support structure. For example, some embodiments of heat-insulating shroud may have rigid end walls that may reduce or eliminate a need for separate support structure such as poles 212, 214 and 216 for keeping at least a portion of the flexible cover away from the heated article. Such an embodiment is illustrated in FIG. 9.

Figure 9:
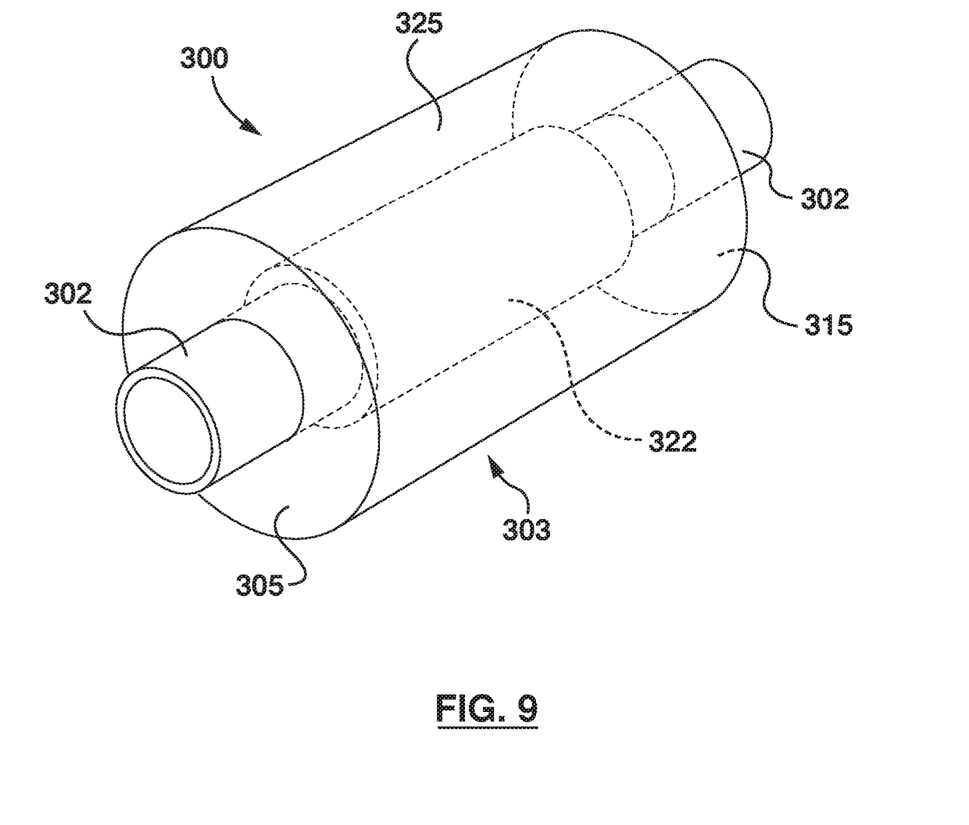
FIG. 9 is a perspective view of an alternative embodiment of heat-insulating shroud having rigid end walls.

Referring to FIG. 9, a heat-insulating shroud 300 embodiment having rigid end walls is shown in perspective view. In FIG. 9, the example shroud is shown after having been installed onto a cylindrical extruder barrel 302 with a band heater 322 attached thereto. The barrel 302 and heater 322 may be similar to the barrel 102 and heater 122 discussed above.

The example heat-insulating shroud 300 of FIG. 9 comprises a pair of rigid annular end walls 305, 315 and a flexible section 325 extending between the end walls. In particular, a distal edge of the rigid end walls 305, 315 supports the flexible section 325 so as to encompass the heater 322. The end walls 305, 315 and flexible section 325 may collectively be referred to as a flexible cover 303, despite the rigidity of end walls 305, 315.

The end walls 305, 315 may for example be made from an insulation that is sufficiently rigid to support the flexible section 325 without the need for any additional support structure. The stiffness and shape of end walls 305, 315 may define the general shape of the shroud 300, which in this example is cylindrical. In alternative embodiments, the end walls 305, 315 may have non-annular shapes, and the general shape of the shroud may be non-cylindrical.

In the illustrated embodiment, each of the rigid end walls 305, 315 extends at a right angle to the extruder barrel 302. The end walls 305, 315 may each have a split or seam (not expressly shown) to facilitate their attachment to the extruder barrel 302. The split or seam may be radial for example. The flexible section 325 may for example be made from cloth, batting, or any other flexible heat-insulating material, including those discussed above with respect to the earlier-discussed embodiment.

For clarity, it should be appreciated that the heat-insulating shroud 300 may further have other features similar to those discussed above in the context of the embodiment of FIGS. 3-8, such as one or more air inlets and one or more air outlets, which are not shown in FIG. 9. The air inlet(s) and/or air outlet(s) could be located in various sections of the flexible cover 303, such as the rigid end walls 305, 315, in the flexible section 325, or in a combination of these.

In any of the embodiments discussed herein, an air inlet may take the form of a hole, a slit or another type of opening. An air inlet could may also be defined by an edge of the flexible cover. The same is true of an air outlet. Air outlets may or may not have flaps or other closures that open when the air pressure within the shroud exceeds ambient pressure outside of the shroud.

It will be appreciated that, in each of the shroud embodiments discussed herein, incorporation of heat-insulating material into the shroud may be considered counter-intuitive because the heat-insulating effects of the material are contrary to the desired cooling effect of the shroud in the cooling mode of operation.

Other modifications may be made within the scope of the following claims.

What is claimed is:
1. A heat-insulating shroud for facilitating temperature control of a heated extruder barrel, comprising:
 a flexible cover made from a heat-insulating material for covering a surface of the heated extruder barrel;
 an air inlet defined in or by a first section of the flexible cover; and
 an air outlet defined in or by a second section of the flexible cover,
 wherein the flexible cover is configured to encompass the heated extruder barrel so as to define an air channel around the heated extruder barrel to channel an air stream from the air inlet over the surface of the heated extruder barrel towards the air outlet to facilitate cooling of the heated extruder barrel.
2. The heat-insulating shroud of claim 1 wherein the heat-insulating material comprises batting.
3. The heat-insulating shroud of claim 1 wherein the heat-insulating material comprises a cloth.
4. The heat-insulating shroud of claim 1 wherein the heat-insulating material comprises at least one of:
 polytetrafluoroethylene (PFTE)-impregnated fiberglass;
 aluminized fiberglass;
 mica-impregnated fiberglass;
 silicone rubber impregnated fiberglass;
 aerogel insulation; and
 ceramic fiber insulation.
5. The heat-insulating shroud of claim 1 wherein the air outlet comprises:
 a hole in the flexible cover; and
 a closure configured to close the hole when an air pressure on an interior of the flexible cover is substantially the same as an air pressure on an exterior surface of the flexible cover, the closing of the hole for limiting heat loss through the hole.
6. The heat-insulating shroud of claim 5 wherein the closure is configured to open the hole when the air pressure on the interior surface of the flexible cover exceeds the air pressure on the exterior surface of the flexible cover, the opening of hole for exhausting the air stream to facilitate the cooling of the heated extruder barrel.

7. The heat-insulating shroud of claim 6 wherein the closure is a flap attached to the flexible cover, the flap being operable to cover the hole to effect the closing.

8. The heat-insulating shroud of claim 7 wherein the closing of the flap is assisted by gravity.

9. The heat-insulating shroud of claim 1 wherein the air outlet comprises a slit in the flexible cover.

10. The heat-insulating shroud of claim 1 wherein the air inlet comprises a hole in the flexible cover, the hole comprising a fitting for attachment of a hose or duct.

11. The heat-insulating shroud of claim 1 further comprising an attachment mechanism for attaching the flexible cover so as to cover the heated extruder barrel.

12. A heat-insulating shroud for facilitating temperature control of a heated article, comprising:
 a flexible cover made from a heat-insulating material for covering a surface of the heated article;
 an air inlet defined in or by a first section of the flexible cover; and
 an air outlet defined in or by a second section of the flexible cover,
 wherein the flexible cover is configured to channel an air stream from the air inlet over the surface of the heated article towards the air outlet to facilitate cooling of the heated article,
wherein the flexible cover has a sleeve shape when in use and wherein the flexible cover comprises a rigid wall at either end or both ends of the sleeve.

13. A heat-insulating shroud for facilitating temperature control of a heated article, comprising:
 a flexible cover made from a heat-insulating material for covering a surface of the heated article;
 an air inlet defined in or by a first section of the flexible cover;
 an air outlet defined in or by a second section of the flexible cover,
 wherein the flexible cover is configured to channel an air stream from the air inlet over the surface of the heated article towards the air outlet to facilitate cooling of the heated article; and
 a support structure for supporting the flexible cover adjacent to the surface of the heated article,
 wherein the support structure comprises a resilient member and wherein the resilient member biases or holds at least a portion of the flexible cover away from the surface of the heated article.

14. A heat-insulating shroud having a cooling mode of operation and a heat-conservation mode of operation, the heat-insulating shroud comprising:
 a flexible cover of heat-insulating material configured to encompass a heated extruder barrel;
 an air inlet defined in or by a first section of the flexible cover; and
 an air outlet defined in or by a second section of the flexible cover,
 wherein, in the cooling mode of operation, the flexible cover defines an air channel over a surface of the heated article, the air channel for channeling an air stream from the air inlet over the surface of the heated extruder barrel towards the air outlet for exhaustion to the atmosphere, the channeling of the air stream to facilitate cooling the heated extruder barrel,
 and wherein, in the heat-conservation mode of operation, the flexible cover of heat-insulating material insulates the heated extruder barrel from heat loss.

15. The heat-insulating shroud of claim 14 further comprising a closure for the air outlet, the closure being operable to close the air outlet in the heat-conservation mode of operation and to open the air outlet in the cooling mode of operation.

16. The heat-insulating shroud of claim 15 wherein the closure is configured to open when a pressure differential from an inner surface of the flexible cover to an outer surface of the flexible cover is positive.

17. The heat-insulating shroud of claim 16 wherein the closure is a flap and wherein closing of the air outlet by the flap is assisted by gravity.

18. The heat-insulating shroud of claim 14 wherein either one or both of the first section of the flexible cover and the second section of the flexible cover is rigid.

19. The heat-insulating shroud of claim 1 wherein a flexibility of the flexible cover not only permits temporary flexing of the shroud to facilitate shroud installation in cramped quarters but also allows for localized deformation of the installed shroud to accommodate outward protuberances from the heated extruder barrel and inward protuberances from the environment towards the heated extruder barrel.

20. The heat-insulating shroud of claim 14 wherein a flexibility of the flexible cover not only permits temporary flexing of the shroud to facilitate shroud installation in cramped quarters but also allows for localized deformation of the installed shroud to accommodate outward protuberances from the heated extruder barrel and inward protuberances from the environment towards the heated extruder barrel.

* * * * *

UNITED STATES PATENT AND TRADEMARK OFFICE
CERTIFICATE OF CORRECTION

PATENT NO. : 10,786,938 B2  
APPLICATION NO. : 15/381794  
DATED : September 29, 2020  
INVENTOR(S) : Harry Jay Kitz et al.

It is certified that error appears in the above-identified patent and that said Letters Patent is hereby corrected as shown below:

In the Claims

Column 14, Line 9, replace "article" with --extruder barrel--

Signed and Sealed this  
Fifth Day of January, 2021

Andrei Iancu  
*Director of the United States Patent and Trademark Office*